July 19, 1960 D. S. McCLUSKEY ET AL 2,945,968
MOUNTING SYSTEM FOR THE MOVING ELEMENT
OF A VIBRATION TABLE EXCITER
Filed March 28, 1957

Inventors
Harry N. Cottle, Jr.
Donald S. McCluskey
By their attorneys
Howson and Howson

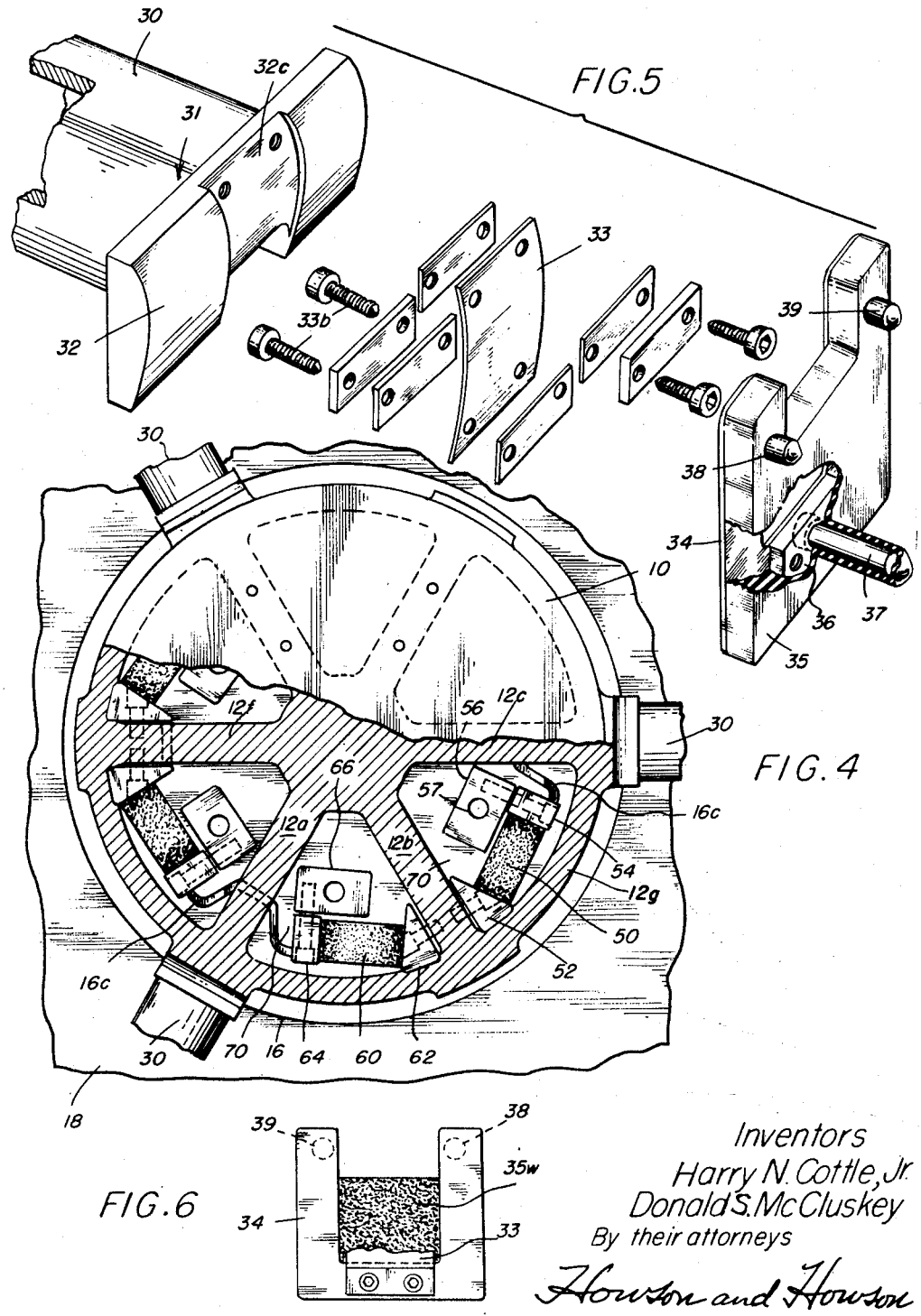

United States Patent Office 2,945,968
Patented July 19, 1960

2,945,968

MOUNTING SYSTEM FOR THE MOVING ELEMENT OF A VIBRATION TABLE EXCITER

Donald S. McCluskey, Northford, and Harry N. Cottle, Jr., Orange, Conn., assignors, by mesne assignments, to Textron Electronics, Inc., Providence, R.I., a corporation of Delaware Filed Mar. 28, 1957, Ser. No. 649,221

2 Claims. (Cl. 310—27)

This invention relates to vibration exciters or like functioning devices having a moving element supported from a fixed element. More particularly, the invention relates to the means for suspending and mounting the moving element or table of vibration exciters or the like.

The invention is a further development of or an improvement upon the flexure links described and claimed in the patent of Erling J. Bligard, 2,838,700 issued June 10, 1958, and assigned to the same assignee as the present application.

According to that invention, various forms of suspension links having rolling contact between the link and the fixed or the movable element, or both, may be employed in various arrangements. When rolling at one end only and when the link is resilient and is fixed at the other end, the link tends to return itself and the moving element to a centered position, i.e. midway between extremes of vibratory motion which also may be referred to as zero-amplitude position.

When using rigid links having rolling contact on each end in certain positions and certain sizes of vibration exciters, special centering means need be provided for moving the moving element to or biasing it toward zero-amplitude position.

Also, it is desirable to avoid introduction of undesirable wave forms in the vibration such as may result from resonances of the link itself. These resonances are at the fundamental and harmonic frequencies of the link and fall to some extent within the operating range of the exciter. By using a short stiff link with rolling contact at each end, the undesirable frequencies are eliminated if the rocker is designed short and stiff enough to have its fundamental frequency above the operating range.

There is a tendency of links which have rolling contact at each end to vibrate longitudinally. Such vibrations are generally at high frequencies which are not easily transmitted very far. According to this invention, they may be isolated or eliminated by properly designed and placed damping pads while still retaining desirable metal to metal rolling contact.

With all the foregoing in mind, one object of the invention is to provide the movable element of a vibration exciter or similarly functioning device with a suspension means free of fundamental resonance in the operating range and a mount which will tend to center the suspension means and movable element.

Another object is to provide the movable element of a vibration exciter or other similarly functioning device with suspension means and mounting means as above in which the centering means has a low mass, has inherent high damping characteristics, will allow large magnitude of vibration and may be located to produce balanced forces without introduction of torque or cocking moments.

Another object of the invention is to provide suspension means, as above, which will be free of endwise vibration, such as by introduction of damping pads to eliminate or overcome chatter and endwise vibration; and a related object is to obtain elimination of endwise vibration and chatter while retaining metal to metal contact of the rolling surfaces.

Other objects and advantages will appear as the invention is described in connection with the accompanying drawings.

In the drawings:

Fig. 4 is a top view, partly broken away and partly in section, of a vibration exciter embodying the invention.

Fig. 5 is an exploded perspective view of one end of a rocker and associated parts for connecting the rocker to the table or bracket.

Fig. 6 is an elevation view of the pad and band employed in the rocker end connection, with the band broken away.

Figure 1:
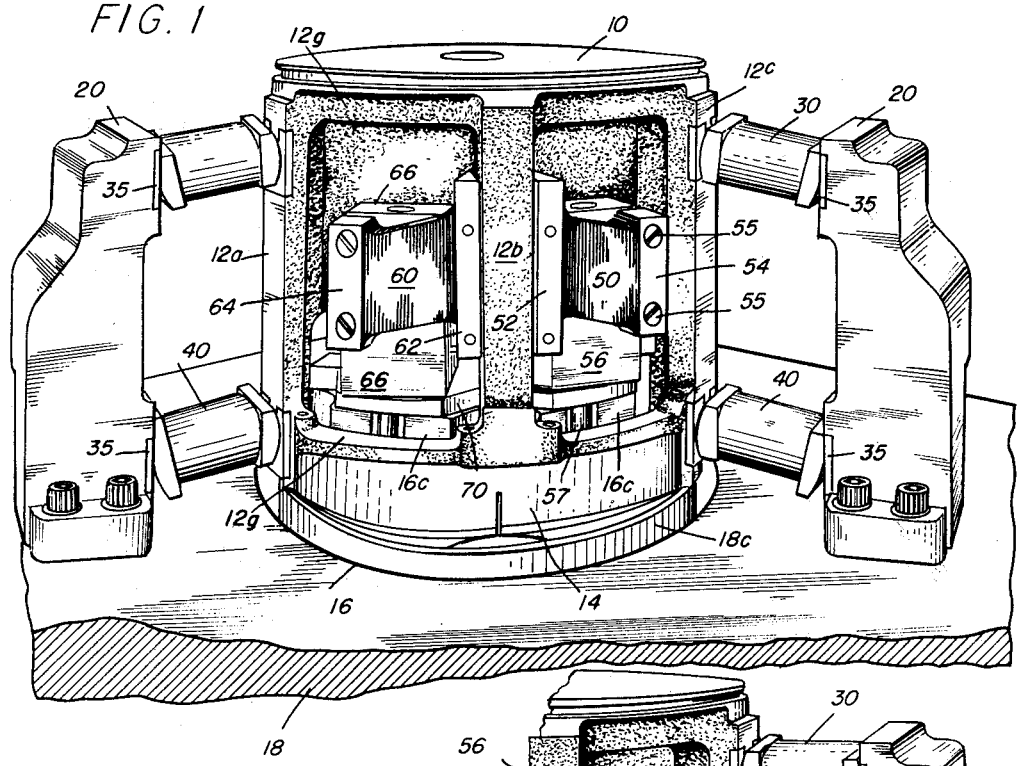
Fig. 1 is a perspective view, partly broken away, of a vibration exciter embodying the invention and showing the moving element above the zero-amplitude position.

Referring to the drawings, the invention is shown as applied to a vibration exciter in which the moving element is made up of a circular top 10 secured upon a movable cast metal frame or supporting table having six legs 12a–12f spaced 60° around a central axis, the legs being connected radially by webs and also circularly at their top and bottom by rims 12g. The table is vibrated by a cylindrical driver coil 14 located in an annular air gap 16 in a fixed core structure 18 around a central core portion 18c of the core structure as usual.

The table is supported by pairs of upper and lower links or rocker members 30 and 40, three pairs being employed in the form shown, spaced 120° around the central axis of the exciter. The number of pairs is not important although three pairs equally spaced, as shown, or two diametrically opposite pairs, or four or more equally spaced pairs may be used, if desired or necessary in particular usages.

The rocker member may be cast, preferably from aluminum or other light metal, into inverted U-shape (in cross section) with a T head or plate, such as 31, 31', on each end. The outer surface 32 of each head is arcuate for providing rolling of the rocker element with reference to the bracket and table. The curve of the arc is about the midpoint of the length of the link so that the rocker may roll like a wheel against and between the bracket and table.

Since the upper end the lower rocker members are identical, description of one will suffice. Also, since the structure of the connection of the rocker to the table and to the bracket is substantially the same on each end (except that at the bracket end the head 31 is of slightly greater width) description of one end will suffice.

In order to provide a non-sliding rockable connection of the rocker to the bracket 20, a rectangular connecting band 33 of thin resilient sheet metal is bolted at one edge to one edge (the upper edge in Fig. 5) of the rocker head. The other edge is bolted by bolts 33b against one face of the transverse portion of a metallic thin resilient U-shaped plate 34 to whose other face a rubber plate or pad 35 is bonded. The pad 35 is also of U-shape with its transverse portion widened into a web 35w. Embedded in the pad 35 and lying against one face of the U-shaped plate 34 is a rectangular metal anchor plate 36 into which securing bolts 33b thread. From the opposite face of the anchor plate extends an integral mounting pin 37 which is covered with rubber. Extending from the face of the pad 35 adjacent the corners of the opposite edge thereof from the rubber covered pin 37 are pins 38 and 39 molded as integral parts of the pad.

The triangularly spaced pins 37, 38 and 39 are provided for locating and mounting the pad and associated parts on the bracket 20 for which purpose three spaced socket holes (not shown) are provided in the inner face of the bracket to receive the pins.

All the rocker elements—both upper (30) and lower (40)—are attached in similar manner to each end of the brackets and also to the table. When mounted, the pads have a tight fit between the rocker and bracket or table and are thus held firmly in place or under slight compression. If desired, a suitable adhesive may be used, additionally to secure the pads to the brackets and table.

When so mounted, the arcuate surfaces 32 can roll over the metal surface of the plates 34, providing metal to metal contact. The pads 35 due to the resilience of the rubber, damp out whatever endwise vibrations tend to occur. This gives a more satisfactory wave form while at the same time providing quiet chatter-free operation.

The midportion 32c of the arcuate surface 32 is recessed or offset inwardly to provide a pocket or channel for connecting band 33, in consequence of which the rolling contact between the head of the rocker and the metal face plate 34 takes place entirely at the end portions of the rocker.

Provision of the pads 35 is advantageous not only for isolating longitudinal vibrations but also because the pads tend to lessen the amplitude, due to the damping by the pads.

When rubber is referred to herein, it will be understood that the invention is not limited to use of rubber but that any other plastic or material having the desired characterisitic of elasticity and very low or no inherent resonance together with high inherent ability to damp vibrations, may be used. Hence, in the claims where plastic materials is referred to, materials having said characteristics including rubber are embraced.

Figure 3:
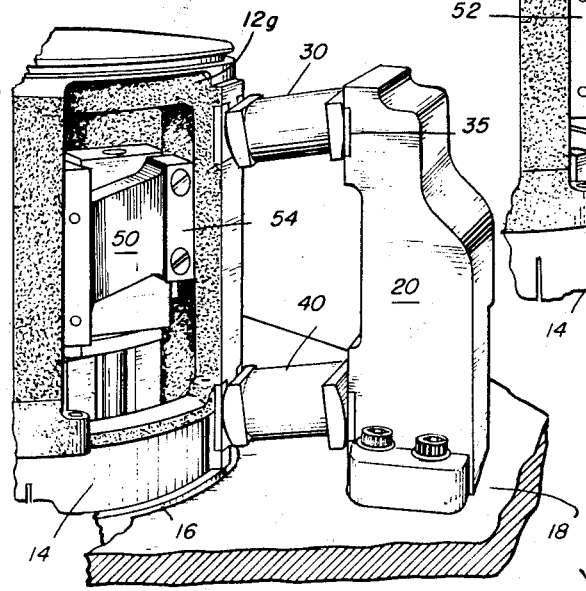
Fig. 3 is a view similar to Fig. 2 with the parts in the lower vibratory position.
Figure 2:
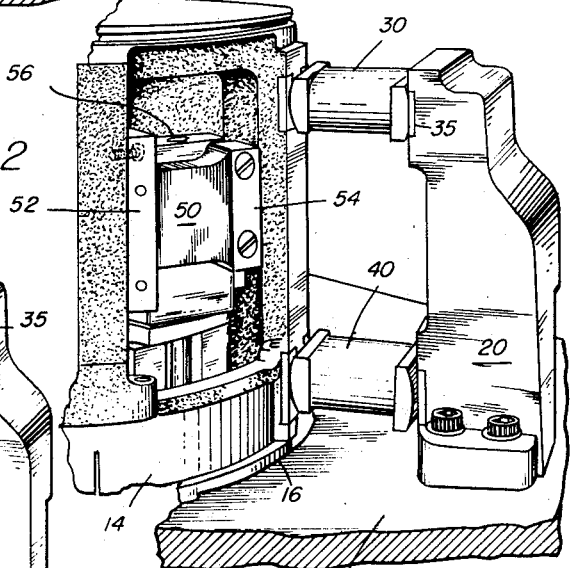
Fig. 2 is a fragmentary perspective view, similar to Fig. 1, but with the parts in mid or normal at-rest position.

In many instances, particularly in larger size exciters it is necessary to provide means to center the movable element or, in other words, to constantly urge it into position midway between the maximum travel, i.e. at zero amplitude position. For that purpose, pairs of opposite resilient rubber mounts 50 and 60 are provided. The mounts are flattened, substantially rectangular, durable blocks positioned parallel to the direction of vibration (vertical in reference to Figs. 1–3) and bonded or otherwise firmly secured at one vertical edge to a wedge-shaped metal mounting plate or block 52 or 62 which in turn is bolted or otherwise firmly secured to a leg such as 12b of the table support on opposite sides of such leg and extending oppositely. The other edges of the blocks are likewise bonded or otherwise firmly secured to rectangular metal mounting plates or blocks 54 or 64 which are bolted or otherwise firmly secured by a pair of screw bolts to mounting posts 56 and 66 in the form of rectangular metal blocks standing endwise on a shield plate 70 lying on top of the core portion 16c. The posts 56 and 66 are bolted securely to the core portion 16c by bolts through the posts parallel to the axis of vibration.

The rubber shear mounts are practically the only means of suspension with no resonance of its own, due to high inherent damping, light weight and low density, while having the necessary elasticity. The shear mounts while tending to center the table during its to and fro or up and down motion are under tension in each direction. The forces act in shear.

Although, the invention having been described as applied to a vibration exciter having three pairs of mounts and three pairs of rolling supporting links other numbers of equally spaced links mounted to provide balance of forces may be used.

The links with rolling contact on each end having elastic damping wear pads and used in conjunction with the elastic damping shear mounts, combine to make up a suspension system which is free from structural resonance of its own. This system fulfills at the same time the requirements for rectilinear vibratory action and other requirements necessary for an efficient and reliable vibratory suspension system.

Many modifications within the scope of the invention will occur to those skilled in the art. Therefore, the invention is not limited to the specific embodiment illustrated and described.

What is claimed is:

1. Means for connecting the end of a rolling suspension element of a vibration exciter to a fixed support and a movable element, comprising a damping pad having a plate bonded to said pad, a flexible resilient band secured at one end to said plate and securable at its other end to said rolling suspension element.

2. Means for connecting the end of a rolling suspension element of a vibration exciter to a fixed support and a movable element, comprising a damping pad having a plate bonded to said pad, a flexible resilient band adjacent one face of said pad, and a plurality of fingers protruding from the face of said pad opposite the band-face for mounting the pad on the fixed support or the movable element.

References Cited in the file of this patent

UNITED STATES PATENTS

| | | |
|---|---|---|
| 2,706,113 | Hickman | Apr. 12, 1955 |
| 2,734,138 | Oravec | Feb. 7, 1956 |
| 2,838,700 | Bligard | June 10, 1958 |

FOREIGN PATENTS

| | | |
|---|---|---|
| 329,850 | Germany | Dec. 4, 1920 |